May 29, 1951 H. J. WHITE 2,555,172

MODULATOR CIRCUIT

Filed Aug. 23, 1944

INVENTOR.
HARRY J. WHITE

BY William D. Hall

ATTORNEY

Patented May 29, 1951

2,555,172

UNITED STATES PATENT OFFICE 2,555,172

MODULATOR CIRCUITS

Harry J. White, Cambridge, Mass., assignor, by mesne assignments, to the United States of America as represented by the Secretary of War Application August 23, 1944, Serial No. 550,792

4 Claims. (Cl. 250—27)

The present invention relates generally to radio impulse systems and more particularly to impulse generators for use in pulse modulator systems and other electrical systems where high power impulses are desirable.

Modern ultra high frequency technique requires, in many applications, the operation of ultra high frequency oscillators, such as the magnetron, at relatively high power levels. Inasmuch as the maximum power level at which continuous operation of these oscillators may be safely maintained is limited by design, it is conventional practice to operate the apparatus with high power inputs for brief periods only, thereby confining the average operating conditions within the limits of safety.

For the purpose of operating oscillators in this manner, modulators are provided which deliver surges or pulses of a high power level, the duration thereof constituting the "on" time of transmission. The interim between pulses, which is long compared with their duration, then determines the time the oscillator is inactive before signals are again transmitted. Modulators for furnishing these high power pulses commonly assumed two forms; namely, the vacuum tube type and the spark gap generator type.

It is an object of the present invention to provide a pulse modulator operating without rectification from an alternating current line thereby obviating the need for direct current power supplies and other direct current components.

It is another object of this invention to provide a pulse modulator of the above type affording a greater peak power output than heretofore obtainable from conventional modulator circuits.

Yet another object of this invention is to provide a modulator circuit whose output voltage is stable regardless or fluctuations in the input voltage.

A further object of this invention is to provide a modulator circuit which does not require external triggering means and whose pulse repetition rate is equal to twice the frequency of the applied alternating current.

It is an additional object of this invention to provide a modulator of the above type which is relatively simple in design and construction.

Figure 1:
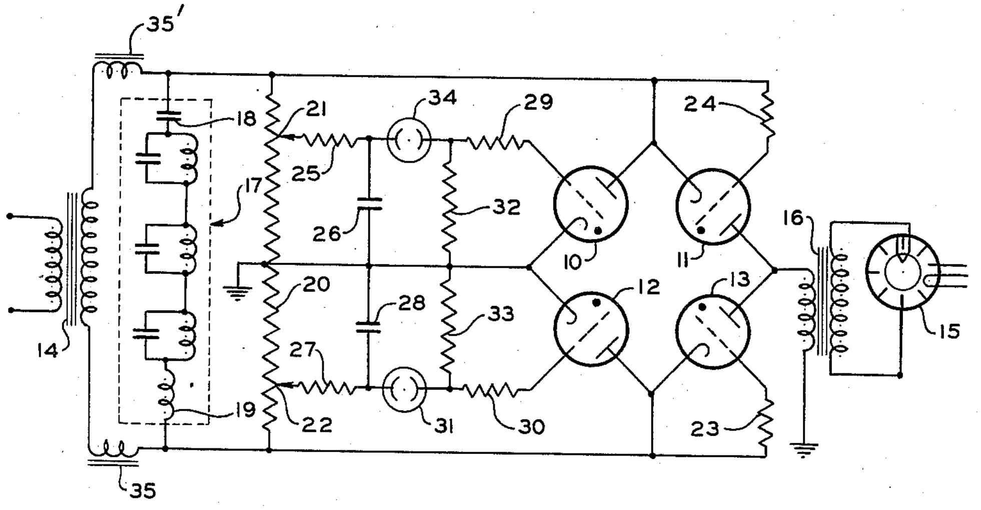
Figure 2:
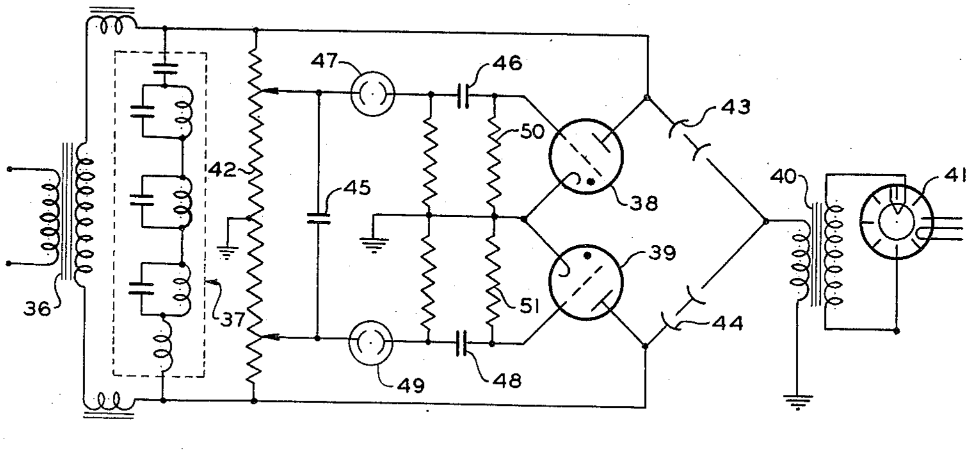

For a better understanding of the invention together with other and further objects and features thereof, reference is had to the following description taken in connection with the accompanying drawing. The scope of the invention will be pointed out in the accompanying claims. In the annexed drawing;

Figure 1 is a schematic circuit diagram of a preferred embodiment of the present invention and Figure 2 is a schematic circuit diagram of a second preferred embodiment of the present invention.

Referring now to the drawing and more particularly to Figure 1, a first embodiment of the invention is disclosed wherein four thyratrons 10, 11, 12 and 13 are employed in a bridge switching arrangement. The modulator circuit is associated with the alternating current power line through a power transformer 14 and is inductively coupled to the load which, by way of example, is shown herein as a magnetron oscillator 15, through a pulse step-up transformer 16.

Bridged across the output of transformer 14 is a pulse-shaping network 17 in the form of a simulated transmission line of the Guillemin type comprising parallel reasonant sections in combination with a series condenser 18 and inductor 19. In the course of an alternating current cycle, condenser 18 is charged first in one direction and by means of a switching arrangement, to be hereinafter disclosed, is discharged through the primary of transformer 16 in a direction inducing a rectangular pulse in the secondary thereof whose polarity is positive at the plate of magnetron 15 and negative at the cathode, thereby activating said oscillator. Thereupon, as the polarity of the impressed alternating current changes, condenser 18 is charged in the opposite direction but by means of the switching arrangement, is discharged reversely through transformer 16 whereby the pulse induced in the output thereof again activates magnetron 15. Consequently, for each complete cycle of applied alternating current there is yielded two pulses in the output of the modulator circuit, the pulse repetition rate being twice the input frequency.

The method and means by which this switching action is accomplished will now be described. Shunted across the secondary of transformer 14 is a voltage divider resistor 20 having two variable taps 21 and 22 and a fixed center tap wired to ground. Thyratrons 11 and 13 have their plates tied together and connected to ground through the primary of pulse transformer 16. The cathodes of thyratrons 10 and 12 are tied together and directly connected to ground. The plate of thyratron 10 and cathode of thyratron 11 are tied together and connected to one end of resistor 20 while the plate of thyratron 12 and cathode of thyratron 13 are tied together and connected to the other end of resistor 20.

Assuming thyratrons 10, 11, 12 and 13 to be nonconductive and the DC resistance of the primary of transformer 16 to be negligible, it will be seen that the potential difference between plate and cathode of each thyratron is equal to one-half the full voltage drop across resistor 20. Bias on thyratron 11 is fixed by resistor 24, while bias on thyratron 13 is fixed by resistor 23; bias on both tubes being such that when the potential difference between their plate and cathode is equal to one-half the voltage across resistor 20, the tubes are biased beyond cut-off.

Connected between variable tap 21 and ground is a fixed resistor 25 in series with a condenser 26, and connected between tap 22 and ground is a fixed resistor 27 in series with a condenser 28. The juncture of resistor 25 and condenser 26 is connected to one terminal of a neon tube 34 or a similar glow discharge tube characterized by constant breakdown potential. The other terminal of neon tube 34 is connected through a current limiting resistor 29 to the grid of thyratron 10. Similarly, the grid of thyratron 12 is connected through a current limiting resistor 30 to a terminal of a neon tube 31, the other terminal thereof being connected at the juncture of resistor 27 and condenser 28. Variable taps 21 and 22 on resistor 20 are positioned at equi-voltage points along divider 20.

In operation, the impressed alternating current wave charges condenser 18 in parallel with condensers 26 and 28 through divider resistor 20. When the magnitude of charge on condensers 26 and 28 attains a breakdown level, neon tubes 34 and 31 are ionized permitting the condensers to discharge through resistors 32 and 33 respectively. Resistor 32 applies a voltage to the grid of thyratron 10 while resistor 33 applies a voltage of equal magnitude but of opposite polarity to the grid of thyratron 12. Thus it is evident that condensers 26 and 28 will be periodically discharged and thyratrons 10 and 12 will be alternately fired in accordance with the alternating polarity of the charging voltage.

When thyratron 10 is fired, the internal impedance thereof is considerably diminished so that the plate of thyratron 13 effectively receives the full voltage across resistor 20, overcoming the bias thereon and firing the tube. With thyratrons 10 and 13 rendered conductive, the pulse forming network 17 is discharged through the primary of transformer 16, one end of condenser 18 being connected to the grounded side of the primary through thyratron 10 and one end of inductor 19 being connected to the other side of the primary of transformer 16 through thyratron 13.

The pulse is formed during the discharge in conformance with the constants of the Guillemin line 17. The pulse induced in the secondary of transformer 16 is in a direction actuating magnetron 15. Coils 35 and 35′ each represent half the inductive reactance of the secondary of transformer 14. The total inductance of the charging circuit to the pulse forming network 17 is preferably made such as to be resonant with the condenser 18 at the frequency of the impressed alternating current wave.

When the direction of applied current reverses and thyratron 12 is fired, the potential difference between plate and cathode of thyratron 11 is doubled overcoming the fixed bias thereon and firing said tube. With thyratrons 11 and 12 rendered conductive, the pulse forming network 17 is again discharged through the primary of transformer 16, but with connections reversed; one end of inductor 19 now being connected to the grounded side of the primary of transformer 16 and one end of condenser 18 being connected to the other side of the primary, so that the pulse induced in the secondary of transformer 16 is in the same direction as when thyratrons 10 and 13 were previously rendered conductive. Accordingly, magnetron 15 is again actuated.

It is to be noted that there will be no peak output voltage variation irrespective of input fluctuations, since neon tubes 34 and 31 ionize quite accurately at a given voltage to furnish substantially constant regulation of the output. This is due to the effective dynamic voltage regulating properties of tubes 34 and 31. Amplitude and frequency fluctuation in the alternating current input wave may cause fluctuations in the repetition rate of the output pulses, but in a synchronous pulse echo system in which the trigger pulse for the sweep circuits is secured from the modulating pulses, this is of no consequence.

By varying the divider ratio of resistor 20, the voltage applied to condensers 26 and 28 can be controlled to meet the firing requirements of the thyratrons. Since thyratrons 10 and 13 discharge in series and thyratrons 11 and 12 likewise discharge in series, the stand-off voltage is doubled and twice as much peak power can be obtained as if a single tube were utilized. Moreover, tube life is lengthened with each tube firing only on every half cycle.

Another preferred embodiment of the invention is disclosed in Figure 2, which is similar in most respects to Figure 1, except that spark gaps supplant thyratrons 11 and 13. By having spark gaps at the secondary or double voltage position, the insulation problem of the thyratron cathode heaters is eliminated, yet at the same time the advantages of the bridge circuit are retained.

The modulator circuit comprises a power transformer 36, a pulse forming network 37, a pair of thyratrons 38 and 39, a pulse step-up transformer 40 and a pair of spark gaps 43 and 44. Also provided is a voltage divider resistor 42, which is shunted across the secondary of transformer 36 and grounded at its center tap.

It will be seen, assuming thyratrons 38 and 39 to be nonconductive and the D. C. resistance of the primary of transformer 40 to be negligible, that the potential difference between the plate and cathode of thyratrons 38 and 39 and the electrodes of spark gaps 43 and 44 is equal to one half the voltage across resistor 42. The spacing between electrodes of spark gaps 43 and 44 is such that in the half voltage condition the potential between electrodes is not sufficient to break down the gap.

Shunted across a tapped portion of resistor 42 is a condenser 45. The grid of thyratron 38 is connected through a coupling capacitor 46 to one terminal of a neon tube 47, the other terminal thereof being connected to one end of condenser 45. The grid of thyratron 39 is connected through a coupling capacitor 48 to one terminal of a neon tube 49, the other terminal thereof being connected to the other end of capacitor 45. The cathodes of thyratrons 38 and 39 are tied together and connected to ground.

The impressed wave charges the pulse forming network 37 in parallel with condenser 45 through divider resistor 42. When condenser 45 attains a charge sufficient to ionize neon tubes 47 and 49, it discharges through resistors 50 and 51. The voltage drop across resistor 50 imposes a voltage on the grid of thyratron 38, while the drop across resistor 51 imposes a voltage on the grid of thyratron 39 of equal magnitude but of opposite polarity. Thyratrons 38 and 39 are alternately fired in accordance with the alternating polarity of the charging voltage. When thyratron 38 is rendered conductive, the voltage applied to the electrodes of spark gap 44 is doubled and is of a magnitude sufficient to fire the gap. Likewise, when thyratron 39 is rendered conductive, the voltage applied to spark gap 43 doubles, breaking down the gap. In consequence, pulse forming network 37 is alternately discharged through thyratron 38 in series with spark gap 44 and thyratron 39 in series with spark gap 43 into the primary of pulse transformer 40. The connections between pulse forming network 37 and the primary of transformer 40 are reversed at each half cycle, so that the pulses induced in the secondary of transformer 40 always have a polarity activating magnetron 41.

While I have shown in Figure 1 a bridge switching arrangement employing thyratron tubes and in Figure 2 is a similar arrangement using spark gaps in combination with thyratron tubes, the invention is not limited thereto. Triggered spark gaps may be installed with equal effectiveness in place of the thyratrons, whereby the spark gap is fired by a voltage applied to the triggering electrode instead of the control grid in the thyratron tube. When triggered spark gaps are used, the peak modulating power fed to the magetron can be greater than when thyratrons are used because of the current limitations of such tubes.

While there have been described what are at present considered preferred embodiments of the invention, it will be manifest to those skilled in the art that various changes and modifications may be made therein without departing from the invention and it is, therefore, aimed in the appended claims, to cover all such changes and modifications as fall within the true spirit and scope of the invention.

What is claimed is:

1. A network for forming unidirectional pulses from an alternating current source comprising a pulse forming network, a source of alternating current for charging said network, a four arm bridge circuit composed of electronic switches adopted to be triggered and having its input terminals associated with said network and its output terminals associated with a load, and means synchronous with said alternating current source for triggering each pair of opposing arms in said bridge circuit at a predetermined point in alternate half cycles of charging wave whereby all pulses developed by said network are applied to said load in the same direction.

2. A network for forming unidirectional pulses from an alternating current source comprising a pulse forming network arranged to be charged by alternating current, a four arm bridge network composed of thyratrons and having its input terminals associated with said pulse forming network, a load associated with the output terminals of said bridge network, and means adapted to be responsive to said alternating current for triggering each pair of thyratrons in opposed arms in said bridge network at a predetermined point in alternate half cycles of said alternating current whereby all pulses developed by said network are applied to said load in the same direction.

3. The network of claim 1, wherein said electronic switches in each of said pair of opposing arms in said bridge circuit comprise a thyratron and a spark gap.

4. The network of claim 1, wherein said means for triggering includes a resistor coupled across said pulse forming network and having a grounded centertap, and a pair of gas discharge tube means for respectively coupling opposite potential points upon said resistor to each of said pair of opposing arms in said bridge circuit.

HARRY J. WHITE.

REFERENCES CITED

The following references are of record in the file of this patent:

UNITED STATES PATENTS

| Number | Name | Date |
|---|---|---|
| 1,992,829 | Marx | Feb. 26, 1935 |
| 2,276,994 | Milinowski | Mar. 17, 1942 |
| 2,337,871 | Cooper | Dec. 28, 1943 |
| 2,405,070 | Tonks et al. | July 30, 1946 |